United States Patent
Quitsch et al.

(10) Patent No.: US 11,658,529 B2
(45) Date of Patent: May 23, 2023

(54) PERMANENT MAGNET ROTOR FOR ELECTRIC MOTOR AND CORRESPONDING AIR PULSING DEVICE

(71) Applicant: Valeo Equipements Electriques Moteur, Creteil (FR)

(72) Inventors: Cordula Quitsch, Creteil (FR); Maxime Pagnard, Creteil (FR); Aziz Bougrassa, Creteil (FR); Omar Bougrassa, Creteil (FR); Laurent Labaste-Mauhe, Creteil (FR); Benjamin Loret, Creteil (FR); Anthony Brisset, Le Mesnil Saint Denis (FR)

(73) Assignee: Valeo Equipements Electriques Moteur, Creteil (FR)

( * ) Notice: Subject to any disclaimer, the term of this patent is extended or adjusted under 35 U.S.C. 154(b) by 656 days.

(21) Appl. No.: 16/633,822

(22) PCT Filed: Jul. 23, 2018

(86) PCT No.: PCT/EP2018/069951
§ 371 (c)(1),
(2) Date: Oct. 5, 2020

(87) PCT Pub. No.: WO2019/020581
PCT Pub. Date: Jan. 31, 2019

(65) Prior Publication Data
US 2021/0399598 A1 Dec. 23, 2021

(30) Foreign Application Priority Data

Jul. 24, 2017 (FR) ...................................... 1756988

(51) Int. Cl.
*H02K 1/27* (2022.01)
*H02K 1/2786* (2022.01)
(Continued)

(52) U.S. Cl.
CPC ........... *H02K 1/2786* (2013.01); *H02K 15/03* (2013.01); *H02K 15/12* (2013.01)

(58) Field of Classification Search
CPC ....... H02K 1/2786; H02K 15/03; H02K 15/12
See application file for complete search history.

(56) References Cited

U.S. PATENT DOCUMENTS

| 5,861,695 A | 1/1999 | Brassard |
| 6,339,271 B1 * | 1/2002 | Noble .................... H02K 15/03 |
| | | 310/43 |

(Continued)

FOREIGN PATENT DOCUMENTS

| CN | 1173950 A | 2/1998 |
| CN | 104659937 A | 5/2015 |

(Continued)

OTHER PUBLICATIONS

The Second Office Action issued in Chinese Application No. 201880060483.0, dated Apr. 12, 2022 (14 pages).

(Continued)

*Primary Examiner* — Thomas Truong
(74) *Attorney, Agent, or Firm* — Osha Bergman Watanabe & Burton LLP

(57) ABSTRACT

A permanent magnet rotor (100) for an electric motor comprises a bell housing (110) comprising an annular wall (112) and at least one permanent magnet (120) fixed to the annular wall by adhesive means (126) sited between a rear face (124) and the annular wall (112). The rear face (124) of the permanent magnet (120) has a receiving zone (134) accepting said adhesive means (126) and defined by a radius of curvature (R', R2) which is greater than the radius of curvature (R) of the annular wall (112).

15 Claims, 3 Drawing Sheets

(51) Int. Cl.
  *H02K 15/03* (2006.01)
  *H02K 15/12* (2006.01)

(56) References Cited

U.S. PATENT DOCUMENTS

| | | | | |
|---|---|---|---|---|
| 7,579,742 B1* | 8/2009 | Rittenhouse | ........... | H02K 1/141 310/43 |
| 7,638,914 B2* | 12/2009 | Miekka | ........... | H02K 1/17 310/154.03 |
| 2004/0207274 A1* | 10/2004 | Ewert | ........... | H02K 7/003 310/51 |
| 2004/0217664 A1* | 11/2004 | Kuwabara | ........... | H02K 1/278 310/156.21 |
| 2006/0196041 A1* | 9/2006 | Hansen | ........... | H02K 3/47 29/605 |
| 2010/0033036 A1 | 2/2010 | Ortt et al. | | |
| 2014/0197708 A1 | 7/2014 | Noda et al. | | |
| 2016/0190881 A1 | 6/2016 | Kanatani et al. | | |

FOREIGN PATENT DOCUMENTS

| | | |
|---|---|---|
| CN | 106253521 A | 12/2016 |
| CN | 106505764 A | 3/2017 |
| GB | 2191638 A | 12/1987 |
| JP | 2005027492 A | 1/2005 |
| JP | 2015027248 A * | 2/2015 |
| JP | 2015027248 A | 2/2015 |

OTHER PUBLICATIONS

The First Office Action issued in corresponding Chinese Application No. 201880060483.0, dated Aug. 26, 2021 (14 pages).
International Search Report and Written Opinion corresponding to International Application No. PCT/EP2018/069951, dated Sep. 26, 2018 (14 pages).

* cited by examiner

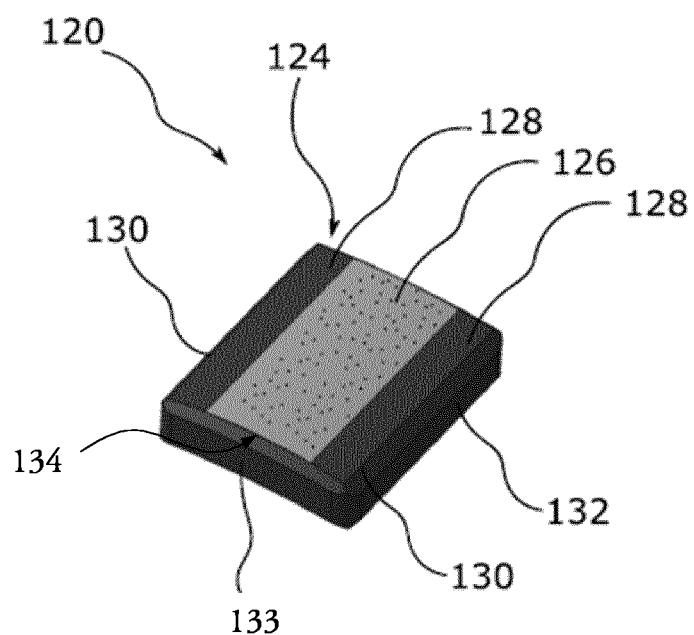
Fig. 6
Fig. 7
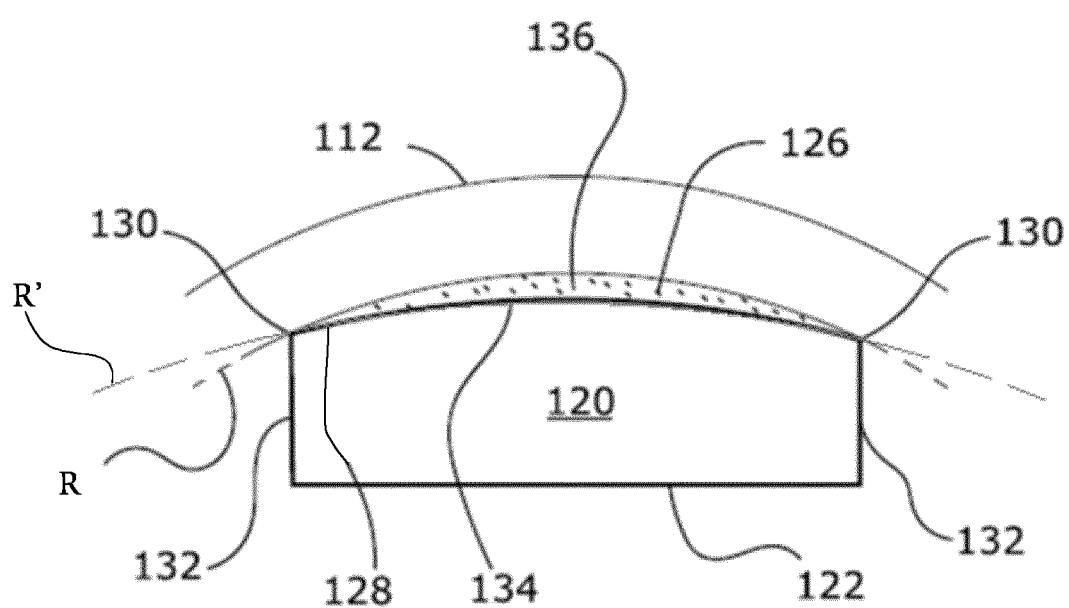

PERMANENT MAGNET ROTOR FOR ELECTRIC MOTOR AND CORRESPONDING AIR PULSING DEVICE

The invention relates to the field of electric motors with electronic commutation, and to the devices for pulsing air in motor vehicles that comprise such electric motors.

An air pulsing device equipped with an electric motor according to the invention is used, for example, in a motor vehicle heating, ventilation and/or air conditioning system. The electric motors that equip this type of device comprise a rotor and stator assembly, each of these components bearing electromagnetic elements the interaction between which generates the movement of the rotor relative to the stator and causes a drive shaft borne by the rotor to turn. Arranged at the free end of the shaft is a blower wheel the movement of which causes air to be drawn in or blown.

The rotor is arranged around the stator and on its internal face bears permanent magnets interacting with coils, powered with current, borne by the stator. The commutation of current in the coils of the stator generates a rotary magnetic field facing which the permanent magnets fixed to the rotor seek to position themselves.

It is known practice to fix the permanent magnets to the internal face of the annular wall using a layer of glue. The layer of glue is applied continuously to the entire periphery of the annular wall, in order to allow for a rapid step of applying the glue and to ensure that each permanent magnet positioned against the annular wall is held by a sufficient quantity of glue. By way of nonlimiting example, provision may be made to apply two continuous runs of glue along the entire periphery of the annular wall at an axial distance apart from one another so that each permanent magnet is engaged with each of the runs of glue. Applying glue to the entire periphery of the annular wall also allows the permanent magnets to be positioned freely along said wall, without the need for concern over the position of the layer of glue. The permanent magnets are thus mounted on the annular wall without any constraints regarding any particular alignment between each permanent magnet and the band of glue. This allows the permanent magnets to be mounted on the annular wall of the rotor quickly.

Nevertheless, this solution does have the disadvantage of interposing a continuous thickness of glue between each permanent magnet and the annular wall of the rotor. The presence of the layer of glue therefore impedes the propagation through the rotor of the magnetic field generated by the interaction of each magnet with the powered coils. In other words, depending on its thickness and its properties, the layer of glue magnetically insulates each permanent magnet from the rotor. This results in the creation of a lower quality electromagnetic coupling between the stator and the permanent magnets held against the bell housing and in less effective operation of the electric motor.

In that context, the invention seeks to propose an alternative to the existing external rotors equipped with permanent magnets.

The invention proposes a permanent magnet rotor for an electric motor comprising a bell housing comprising an annular wall and at least one permanent magnet fixed to the annular wall by adhesive means sited between the annular wall and a rear face of the permanent magnet.

The invention is characterized in that the rear face of the permanent magnet has a fixing zone defined by a radius of curvature which is greater than the radius of curvature of the annular wall, said fixing zone thus contributing to forming a cavity for accepting said adhesive means.

In other words, advantageously, a flat is formed on the rear face to allow the adhesive means to be housed on a defined portion of the permanent magnet. The invention thus proposes to use the adhesive means discontinuously along the annular wall of the bell housing, so as to allow part of the rear face of the permanent magnet comprising a rear face with such a radius of curvature to be in direct contact with the bell housing on each side of a fixing zone in which the adhesive retaining means are confined. In those places where there is direct contact, there is no intermediate adhesive means between the magnet and the bell housing, not even a very fine film of adhesive. In order to achieve that, the adhesive retaining means is applied in the fixing zone in a highly localized manner. The adhesive means may be glue or another adhesive. The inventors have thus found that far better quality electromagnetic coupling with a stator positioned in the housing formed by the bell housing is achieved. Of course, the bell housing is preferably made from a magnetic material that encourages the passage of a magnetic flux between the permanent magnets and the bell housing. By way of example, the bell housing is formed from ferromagnetic or paramagnetic materials. According to another advantage, a lower quantity of adhesive means is used to hold the magnets on the bell housing since no adhesive means is sited on the bell housing between two neighboring permanent magnets. The invention also makes it possible to make savings on the quantity of adhesive means used in the manufacture of the rotor.

In other words, the radius of curvature of a surface delimited by the fixing zone is chosen in such a way as to form a cavity between the permanent magnet and part of the internal annular wall of the bell housing of the rotor when the permanent magnet is attached to the bell housing of the rotor, the volume of this cavity being chosen to be large enough to allow the adhesive means to fix the permanent magnet against the annular wall. The volume of the cavity thus formed can be modified and notably according to the adhesive means used and to the weight of the permanent magnet. To this end, it will be appreciated that the fixing zone may delimit a surface of which the radius of curvature is more or less greater than the radius of curvature of the annular wall of the bell housing of the rotor. In particular, the ratio between the radius of curvature of a surface delimited by the fixing zone and the radius of curvature of the internal annular wall may be greater than 1.1, preferably comprised between 1.1 and 4.2. For example, this ratio is of the order of 1.4. This ratio makes it possible to obtain a maximum radial thickness of the cavity, notably in a central part thereof, comprised between 0.08 mm and 0.23 mm. For example, this thickness is of the order of 0.15 mm. This range of thicknesses makes it possible to ensure good fixing of the magnet.

In this context, provision may be made for the rear face of the permanent magnet to comprise a fixing zone formed by one or more concavities and therefore having one or more surfaces that have their own radius of curvature, each of these radii of curvature being in accordance with what has been specified hereinabove, namely greater than the radius of curvature of the annular wall of the bell housing, so as to increase the volume of the cavity formed between at least one permanent magnet and the bell housing.

Alternatively or at the same time, provision may be made for the annular wall of the bell housing to comprise, at least in the region of collaboration with the permanent magnet, one or more concavities, once again for the purpose of increasing the volume of the cavity formed between at least one permanent magnet and the bell housing.

According to a first series of features, considered alone or in combination, provision may be made that:

- the fixing zone that accepts said adhesive means extends partially over the dimension of the rear face of the at least one permanent magnet, which dimension is defined from one lateral edge to the other;
- the rear face is configured in such a way that the fixing zone is bordered laterally by two contact zones for contact with the annular wall, said adhesive means being contained in the fixing zone; in other words, the contact zones are separated by a single fixing zone; according to another alternative, several fixing zones delimiting surfaces with different curvatures may be interposed between the contact zones;
- each contact zone is delimited by a surface of which the radius of curvature is less than the radius of curvature of the surface delimiting the fixing zone;
- the surface delimiting the fixing zone occupies between 20% and 60%, preferably between 25% and 40%, of the surface of the rear face of the at least one permanent magnet. That then ensures a sufficient quantity of glue to correctly fix the permanent magnet and the presence of passages, on each side of this fixing zone which are without glue interposed between the permanent magnet and the bell housing of the rotor which are extensive enough to allow the passage of the magnetic flux of the permanent magnet to the bell housing of the rotor.

The contact zone for the permanent magnet is a zone of direct contact between the annular wall of the bell housing and the magnet without the interposition of the adhesive means.

The ratio between the radius of curvature of a surface delimited by a fixing zone and the radius of curvature of a surface delimited by a contact zone of any one same permanent magnet is equal to or greater than 1, preferably comprised between 1 and 4.2. In other words, the entirety of the rear face of the permanent magnet may have the same one single curvature or may have at least two different curvatures. In the latter instance, the fixing zone is preferably centered on the rear face so as to encourage a contact surface defined by the zones of contact with the annular wall which is equally distributed on each side of the fixing zone. According to one preferred exemplary embodiment, the fixing zone forms a flat when the contact zones delimit surfaces of which the radius of curvature is identical to that of the annular wall.

According to another series of features of the invention, provision may be made that the fixing zone that accepts said adhesive means extends over the entire dimension of the rear face of the at least one permanent magnet, which dimension is defined from one lateral edge to the other. In that case, the at least one permanent magnet may be in contact with the annular wall of the bell housing of the rotor via the lateral edges of this magnet, on each side of the fixing zone.

According to features of the invention, the bell housing of the rotor delimited by the annular wall extends along a longitudinal axis and the contact zones each delimit a surface extending along this longitudinal axis. In other words, preferably, the contact zones extend along the rear face of a permanent magnet in such as way as to encourage uniform contact over the entire length of the permanent magnet along the annular wall of the rotor.

According to one feature of the invention, in a series arrangement of a plurality of permanent magnets on the periphery of the annular wall of the bell housing of the rotor, at least two identical and adjacent permanent magnets are separated by an angular distance of between 5° and 20°. A person skilled in the art will appreciate that this angular distance is dependent on the polarity of the machine and on the number of permanent magnets.

According to one feature of the invention, the rotor comprises at least one permanent magnet of which the front face has a curve parallel to that of the annular wall of the bell housing or, in other words, of which the front face can be inscribed inside a right cylinder coaxial with the right cylinder inside which the annular wall of the bell housing of the rotor can be inscribed.

The adhesive means may consist of a glue, present in a cavity formed between part of the annular wall of the bell housing and the fixing zone defined by the shape of the rear face of at least one permanent magnet. By way of example, the glue may be a single-component acrylate-based or epoxy-type resin, the curing of which occurs upon exposure to UV and/or UVA radiation.

According to an alternative, the adhesive means may comprise a double-sided sticky tape applied beforehand to the rear face of the magnet without overrunning onto the contact zones of this magnet.

According to one feature of the invention, the fixing zone accepting the adhesive means may extend along the rear face of the at least one permanent magnet in such a way as to emerge onto a transverse face of this permanent magnet. That way, at least one access to the glue is formed to make it easier to heat this glue using suitable UV radiation to modify the glue and ensure that it adheres to the annular wall of the bell housing of the rotor.

The rotor according to the invention may notably comprise a plurality of permanent magnets arranged in series on the periphery of the annular wall, each permanent magnet comprising a fixing zone forming a cavity to accept adhesive means for fixing to the annular wall, this annular wall being devoid of adhesive means between two successive permanent magnets, and each permanent magnet may comprise contact zones for contact with the annular wall, these being arranged laterally, namely as close as possible to a neighboring permanent magnet.

The invention also relates to an air pulsing device for a motor vehicle, comprising a blower wheel driven in rotation by an electric motor comprising a stator bearing an electrically powered winding and an external rotor, the rotor being in accordance with what has just been described hereinabove, notably with regard to the shape of the rear face of at least one permanent magnet and the presence of adhesive means in clearly determined zones. What is meant by an air pulsing device is a device allowing air to be drawn in and/or blown.

The invention also relates to a motor vehicle comprising an air pulsing device described above.

Of course, the features, alternative forms and different forms of embodiment of the invention which are mentioned hereinabove may be associated with one another in various combinations provided that they are not mutually incompatible or mutually exclusive.

Other features and advantages of the present invention will become more clearly apparent through the description and the attached drawings:

FIG. 6 is a perspective view similar to that of FIG. 4, illustrating a second type of permanent magnet used by the invention, covered in part with a layer of glue; and FIG. 7 is a view similar to that of FIG. 5, illustrating the collaboration between a rotor and a third type of permanent magnet.

Figure 1:
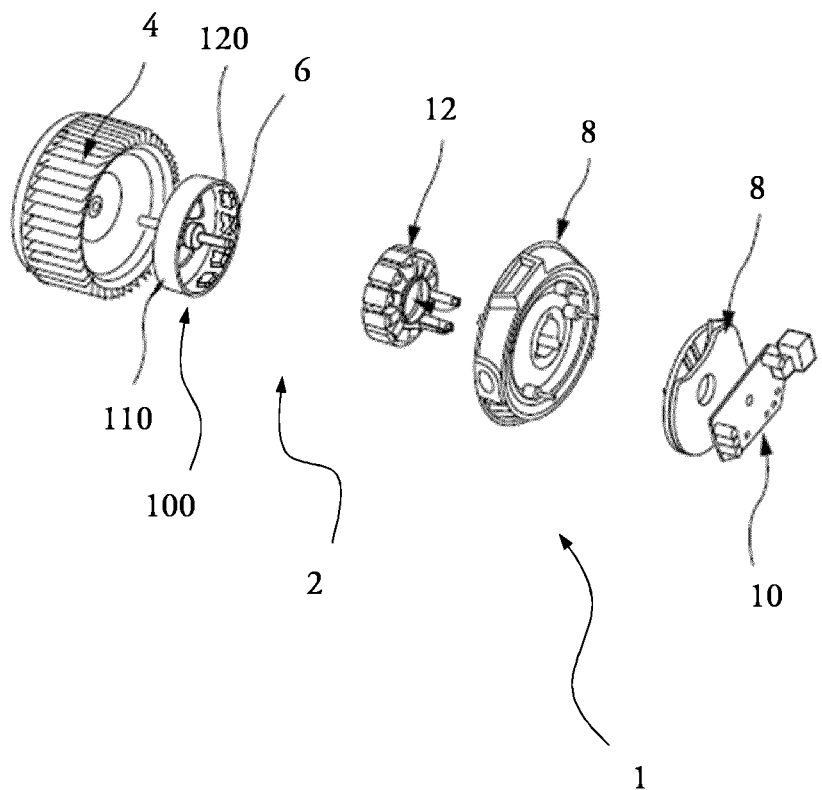
FIG. 1 is an exploded perspective depiction of an air pulsing device equipped with a blower and with a drive motor comprising at least one external rotor equipped with permanent magnets.
Figure 2:
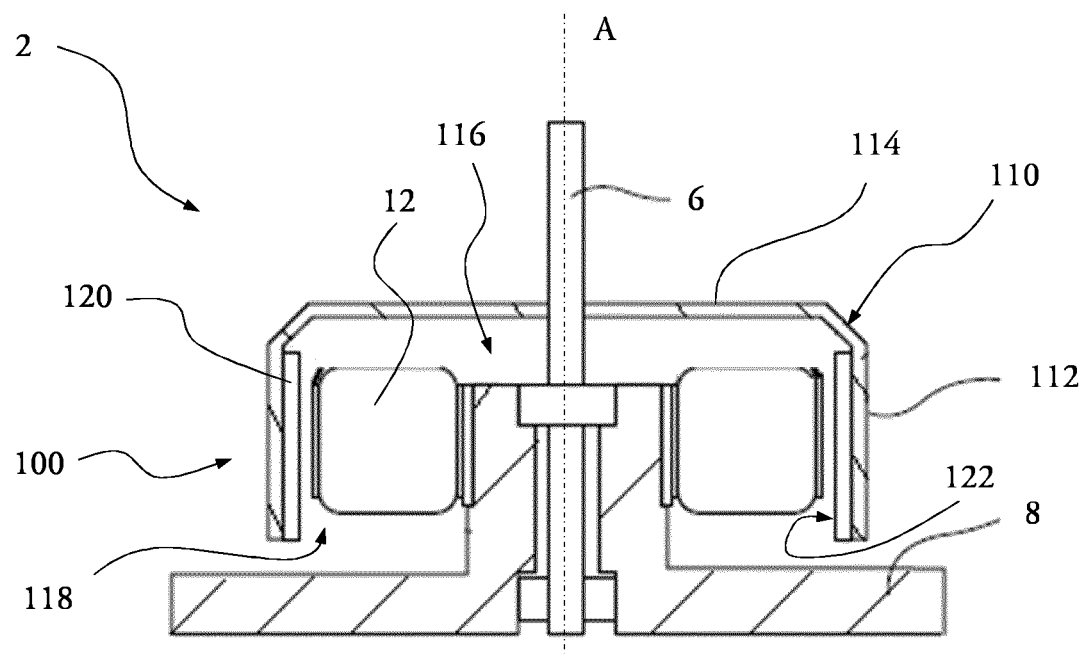
FIG. 2 is a view in an axial plane of section of the rotor and of the stator of the electric motor of FIG. 1.

An air pulsing device 1, which allows air to be drawn in and/or blown out, comprises at least one electronic commutation electric motor 2 able to drive the rotation of a blower wheel 4, in this instance of the vane type, via an output shaft 6 of the electric motor. The device further comprises at least one support means 8 for supporting the electric motor 2, forming a heat sink of the motor and to which an electronic control board 10 of said electric motor 2 is fixed.

The electric motor 2 mainly comprises a stator 12 and a rotor 100, bearing the output shaft 6 able to drive the blower wheel 4. The stator 12 is secured to the support means 8, and the rotor 100 is arranged around the stator 12 so as to be rotated under the effect of the magnetic fields generated by the winding and the permanent magnets 120 associated with the rotor and which will be described in greater detail hereinafter.

Figure 3:
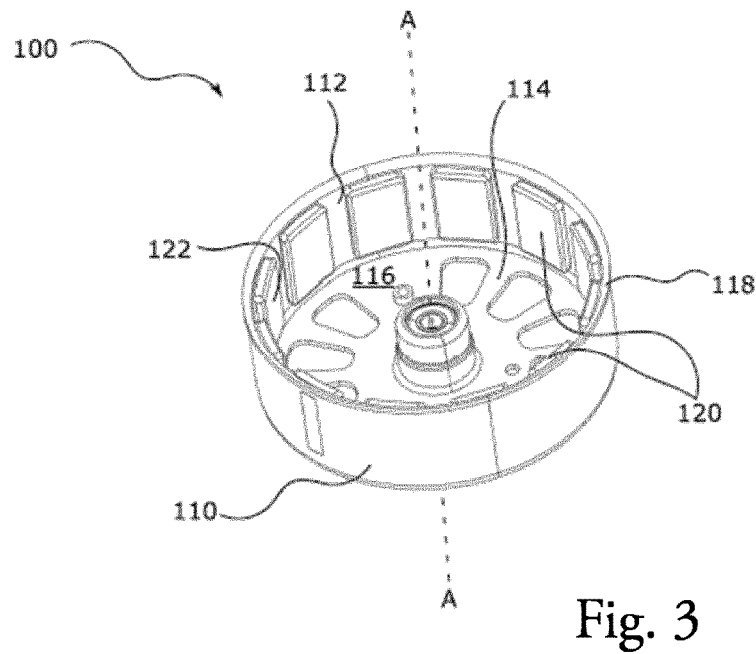
FIG. 3 is a perspective view of a rotor according to the invention, notably comprising a bell housing and several permanent magnets fixed to the annular wall of this bell housing.

As illustrated in FIG. 3, the rotor 100 according to the invention comprises a bell housing 110 comprising an annular wall 112 and a transverse wall 114 delimiting a housing space 116. More specifically, the bell housing 110 is dimensioned and open at one end 118, the opposite end from the transverse wall, in such a way as to allow the stator 12 to be positioned in the housing space 116.

The bell housing 110 has a shape that exhibits symmetry of revolution about a longitudinal axis (AA) about which the annular wall 112 extends so as to form the housing space 116 in the shape of a right circular cylinder.

As is visible notably in FIG. 3, at least one permanent magnet 120 is arranged along the annular wall 112 of the bell housing. Each permanent magnet 120 has the shape of a tile with two main faces, which are a front face 122, facing toward the center of the housing space 116 when the magnet is fixed to the bell housing of the rotor, and an opposite rear face 124 kept facing the annular wall 112 of the bell housing by adhesive means 126 and, in particular, in the detailed description which will follow, by glue.

Each permanent magnet 120 also has four peripheral faces each connecting the front face and the rear face of the permanent magnet to one another, and of these four peripheral faces it will be possible to identify two lateral faces 132, arranged parallel to the longitudinal axis AA of the bell housing 110, and two transverse faces 133, arranged across this longitudinal axis of the bell housing. In an arrangement as illustrated in FIG. 3, in which a plurality of permanent magnets 120 are arranged on the periphery of the bell housing, over the entire periphery of the annular wall 112 about the longitudinal axis AA, it will be appreciated that the permanent magnets are arranged with their lateral faces 132 facing a lateral face of a neighboring permanent magnet.

According to the invention, the rear face 124 of at least one permanent magnet at least partially has a radius of curvature different from the radius of curvature of the annular wall 112 against which the permanent magnet is intended to be pressed, and more particularly has a fixing zone 134 for the permanent magnet, of which the radius of curvature is greater than the radius of curvature of the annular wall 112, in order to form a receiving cavity 136 to accept the adhesive means 126.

In that way, the rear face 124 of this at least one permanent magnet is configured to form at least the fixing zone 134 surrounded where appropriate with contact zones 128 for contact with the bell housing 110 when the permanent magnet is fixed to this bell housing, the glue accepting cavity being arranged between these contact zones.

Figure 4:
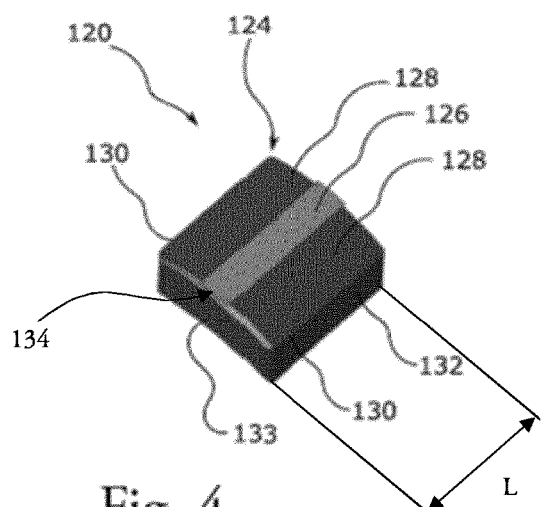
FIG. 4 is a perspective view of a permanent magnet illustrated in FIG. 3, here of a first type, partially covered with a layer of glue.
Figure 5:
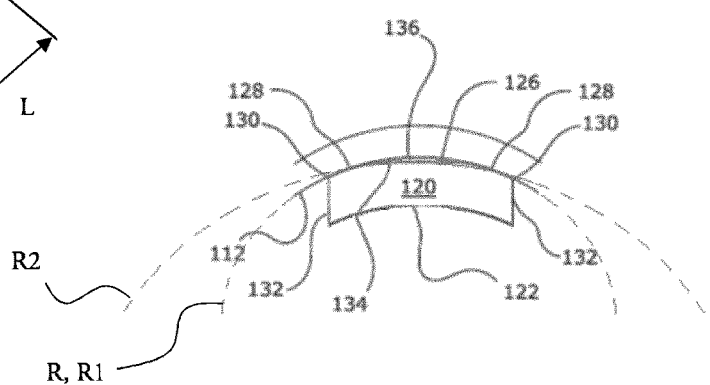
FIG. 5 is a partial depiction of the rotor of FIG. 3, homing in on a permanent magnet as illustrated in FIG. 4, and viewed from above.

One exemplary embodiment of a rotor employing a first type of permanent magnet will be described in greater detail with reference to FIGS. 4 and 5.

The rear face 124 of the permanent magnets is configured in such a way as to exhibit, across its width, namely in the orthoradial dimension of the bell housing when the permanent magnet is positioned on the annular wall, three successive zones from one lateral face 132 to another, and notably two lateral contact zones 128 surrounding a central fixing zone 134.

Each lateral contact zone 128 extends between the fixing zone 134 and one lateral edge 130 of the rear face 124 which corresponds to a junction of the rear face 124 with a lateral face 132. Each contact zone 128 delimits a surface of which the radius of curvature R1 is identical to the radius of curvature R of the annular wall 112. According to the present example, each contact zone 128 delimits a band extending along the entire length of the permanent magnet 120, namely along the entire dimension of the permanent magnet parallel to the longitudinal axis AA of the rotor. The contact zones 128 preferably define identical bands equally distributed on each side of the fixing zone 134.

The fixing zone 134 delimits a surface of which the radius of curvature R2 is far greater than that of the annular wall 112 so as to form a flat. As illustrated in FIG. 5, the result of this is that the fixing zone 134 is distant from said wall and that a cavity 136 is thus formed between the permanent magnet 120 and the bell housing 110 when the permanent magnet 120 is attached against the annular wall 112 of the bell housing of the rotor. According to the invention, the glue 126 used for fixing the permanent magnet to the bell housing of the rotor is applied mainly in this cavity, without overrunning onto one or other of the contact zones 128.

These features, namely the presence of a cavity and the application of glue in this cavity, mean that the permanent magnet 120 is fixed by gluing to the annular wall 112 of the bell housing of the rotor with the contact zones 128 which are in direct contact with the annular wall 112. The fact that the contact zones 128 have a first radius of curvature R1 equal to the radius of curvature R of the annular wall means that the surface of direct contact between the permanent magnet and the rotor can be extended over all the contact zones 128.

According to the present example, the cavity 136 formed by the fixing zone 134 has the form of a central band which is centered on the rear face 124 of the permanent magnet 120, and each of the contact zones 128 of the one same permanent magnet, and advantageously from one permanent magnet to another, has identical dimensions.

The central band formed by the cavity extends continuously over the entire longitudinal dimension of the permanent magnet, namely from one transverse face 133 to the opposite transverse face. This means that there are openings for accessing the glue contained in the cavity which are sited on the transverse faces 133 at each longitudinal end of the permanent magnet, and these openings will notably allow the glue to be cured as described hereinafter.

By way of example, the glue employed here is a single-component acrylate-based glue which is cured by exposure to UV and/or UVA radiation.

An example of a method for fixing the permanent magnets to the bell housing of the rotor will now be described. First of all, a quantity of glue 126 is applied to the cavity 136 formed by the surface delimited by the fixing zone 134 of a permanent magnet when the latter is distant from the bell housing. This then makes the step of applying the glue easier by favoring accessibility to the face of the permanent magnet that is to be covered with glue so that optimal filling of the cavity and metered use of glue to achieve this filling can thus be assured. Each permanent magnet is filled, at its cavity 136, with its own specific volume of glue 126.

Secondly, the permanent magnets are brought into contact with the internal face of the annular wall of the bell housing of the rotor. These permanent magnets may be brought against the bell housing one by one or simultaneously using an expanding mandrel. It should be noted that the viscosity properties of the glue allow it to remain in the cavity 136 for the time taken for the permanent magnet to be brought up against the annular wall of the bell housing of the rotor.

The glue is then cured to fix the position of the permanent magnet on the bell housing of the rotor, and notably by exposing the glue 126 to a source of UV and/or UVA radiation in order to accelerate this curing. According to the invention, it is notable that the openings providing access to the glue formed at each longitudinal end of the cavity on one of the transverse faces 133 facilitate the heating of the glue by the UV radiation.

It will be appreciated that the source of UV radiation is brought up to face each of the permanent magnets 120 via the open end 118 of the bell housing. Thus, a variant could be implemented whereby the fixing zone 134, of which the particular curvature contributes to forming the cavity 136 in which the glue 126 is inserted, opens longitudinally onto just one of the transverse faces 133 of the permanent magnet, it being understood that, in such a case, said magnet would need to be sited with a precise orientation so that this specific transverse face faces toward the open end 118 of the bell housing.

The invention favors individualized application of glue for each permanent magnet over an application of glue that is communal to each permanent magnet over the entire periphery of the annular wall of the bell housing. This results in efficiencies in the application of glue because no glue is applied to a portion of the bell housing that is not covered by a permanent magnet. Another advantage is that each fixing zone 134 delimits with the annular wall 112 of the bell housing a cavity of fixed volume making it possible to control with precision the quantity of glue 126 filling each cavity. This then ensures that the quantity of glue filling each cavity 136 is controlled and corresponds to the quantity needed to hold each permanent magnet 120 against the annular wall 112. Another advantage is that the quantity of glue 126 filling each cavity 136 is metered, making it possible to ensure that each permanent magnet 120 is held the same way against the bell housing 110 while at the same time optimizing the quantity of glue employed.

It is notable that the fixing zone 134 is arranged across the width of the permanent magnet, in the center thereof, so as to be flanked laterally by the contact zones. The path of the magnetic flux can thus pass from the permanent magnet into the bell housing on each side of the fixing zone in which the glue is concentrated, and the intensity of the magnetic flux is thus not diminished by the presence of the glue. Furthermore in a rotor in which a plurality of permanent magnets of that sort are arranged in series, the circulation of the magnetic flux is facilitated by reducing the distance between the passage of the flux of one permanent magnet to the bell housing and the passage of the flux from the bell housing to the neighboring permanent magnet.

Of course, the volume of the cavity formed between a permanent magnet 120 and the annular wall 112 of the bell housing may vary according to the dimensions of the permanent magnet, to its weight and to the nature of the glue employed. By way of example, the volume of a cavity 136 may be comprised between 5 mm$^3$ and 100 mm$^3$, preferably between 10 mm$^3$ and 50 mm$^3$. The dimensions of the cavity 136 may also vary according to the radius of curvature R of the annular wall 112 of the bell housing, to the length L of the permanent magnet 120, to the widths of the contact zones 128 and of the fixing zone 134 and to the radius of curvature of the surface delimited by the corresponding fixing zone 134. According to what has been specified hereinabove, what is meant by "width" is the distance separating the lateral edges of the one same zone in the direction defined by the succession of each of the zones of a permanent magnet.

FIGS. 6 and 7 illustrate alternative forms of embodiment in which the widths of the contact zones 128 diminish to the detriment of the width of the fixing zone.

The permanent magnet of the second type illustrated in FIG. 6 thus differs from the permanent magnet of the first type described hereinabove in that the quantity of glue that can be housed on the fixing zone 134 is greater, making it possible to ensure better retention of the permanent magnet, and in that the zones for passage of the magnetic flux on each side of this fixing zone, in the zones of direct contact with the bell housing of the rotor without any interposed glue, are reduced.

Further still, the rotor illustrated in FIG. 7 differs in that the contact zones 128 for contact with the bell housing of the rotor are limited to the lateral edges 130 alone, thus forming edge corners for contact with the bell housing. In other words, the rear face 124 of the permanent magnet 120 has a regular convex surface with an identical radius of curvature between the two edges 130 defined by the opposite lateral faces 132. In the context of the invention, the radius of curvature R' of the rear face 124 is greater than the radius of curvature R of the annular wall 112 of the bell housing 110, so as once again to form a cavity 136 in which glue 126 is present in order to hold the permanent magnet 120 against the bell housing 110. In this case, it will be appreciated that the fixing zone 134 contributing to forming the cavity extends over the entire rear face 124.

By way of example, the ratio between the radius of curvature R' of the rear face 124 and the radius of curvature R of the annular wall 112 of the bell housing 110 may be greater than 1.1 and preferably less than 4.2. This latter alternative form of embodiment makes it possible, while maintaining direct contact between the rear face 124 of the permanent magnet 120 and the bell housing 110 at the edges 130 formed where the rear face 124 and the lateral faces 132 meet, to reduce the maximum depth of the cavity 136 and therefore the maximum separation between the rear face 124 and the annular wall 112, this having the effect of minimizing the adverse effects of the glue on the propagation of a magnetic flux generated by the permanent magnet 120 toward the bell housing 110.

According to the foregoing, lateral contact zones of contact between the permanent magnet and the bell housing of the rotor are formed by the lateral edges and the glue 126, when applied in the cavity 136 and when the permanent magnet 120 is pressed against the annular wall 112, is accessible via only one or the transverse faces 133.

The foregoing description seeks to explain how the invention makes it possible to achieve its stated objectives and notably make it possible to offer an electric motor, notably for an air pulsing device, which optimizes the paths of the magnetic flux and rationalizes the use of glue for fixing the permanent magnets to the bell housing of the rotor, by creating a glue accepting zone in each of the permanent magnets and by applying glue specific to each permanent magnet rather than performing an operation of applying glue to the entire periphery of the permanent magnets. The various alternative forms of embodiment of the invention, including those described hereinabove by way of example, employ a glue application zone specific to each permanent magnet and created at the center thereof so that contact zones without interposed glue are created for the good transmission of the magnetic flux between the magnets and the bell housing. It is notable that, according to the invention, these contact zones are lateral and therefore as close as possible to the neighboring permanent magnet. In this way, for a magnetic field created by the interaction between the wound stator and one of the permanent magnets, the dimension of the field lines looping back via the neighboring permanent magnet is reduced.

However, the invention is not restricted only to the rotors and air pulsing devices according to the alternative forms of embodiment explicitly described with regard to the figures, it being understood that modifications can be made thereto without departing from the context of the invention, notably in terms of the sizing of the zones defined by the radius or radii of curvature formed on the rear face of the magnet facing the bell housing of the rotor. Likewise, forming a cavity to accept said adhesive means with a chamfer having substantially the shape of a straight line the radius of curvature of which is very large by comparison with that of the bell housing would not constitute a departure from the scope of the invention.

The invention claimed is:

1. A permanent magnet rotor for an electric motor comprising:
   a bell housing comprising an annular wall; and
   at least one permanent magnet fixed to the annular wall by adhesive means sited between the annular wall and a rear face of the permanent magnet,
   wherein the rear face of the permanent magnet has a fixing zone defined by a radius of curvature which is greater than the radius of curvature of the annular wall, said fixing zone thus contributing to forming a cavity for accepting said adhesive means, and
   wherein the ratio between the radius of curvature of the surface delimited by the fixing zone and the radius of curvature of the annular wall is comprised between 1.1 and 4.2.

2. The rotor as claimed in claim 1, wherein the fixing zone that accepts said adhesive means extends partially over the dimension of the rear face of the at least one permanent magnet, which dimension is defined from one lateral edge to the other.

3. The rotor as claimed in claim 2, wherein the rear face is configured so that the fixing zone is bordered laterally by two contact zones for contact with the annular wall, said adhesive means being contained in the fixing zone.

4. The rotor as claimed in claim 3, wherein each contact zone is delimited by a surface of which the radius of curvature is less than the radius of curvature of the surface delimiting the fixing zone.

5. The rotor as claimed in claim 2, wherein the surface delimiting the fixing zone for the adhesive means occupies between 25% and 40% of the surface of the rear face of the at least one permanent magnet.

6. The rotor as claimed in claim 1, the fixing zone that accepts said adhesive means extends over the entire dimension of the rear face of the at least one permanent magnet, which dimension is defined from one lateral edge to the other.

7. The rotor as claimed in claim 6, wherein the at least one permanent magnet is in contact with the annular wall via the lateral edges of the magnet, on each side of the fixing zone.

8. The rotor as claimed in claim 1, wherein the adhesive means consist of a glue.

9. The rotor as claimed in claim 8, wherein the glue is a single-component acrylate-based glue.

10. The rotor as claimed in claim 1, wherein the fixing zone accepting the adhesive means extends along the rear face of the at least one permanent magnet so as to emerge onto a transverse face of this permanent magnet.

11. The rotor as claimed in claim 1, further comprising: a plurality of permanent magnets arranged in series on the periphery of the annular wall, each permanent magnet comprising a fixing zone forming a cavity to accept adhesive means for fixing to the annular wall, this annular wall being devoid of adhesive means between two successive permanent magnets.

12. The rotor as claimed in claim 11, each permanent magnet comprises contact zones for contact with the annular wall, these being arranged laterally, namely as close as possible to a neighboring permanent magnet.

13. The rotor as claimed in claim 1, wherein at least one permanent magnet comprises a front face which has a curve parallel to that of the annular wall of the bell housing.

14. An air blower device for a motor vehicle, comprising:
    a blower wheel driven in rotation by an electric motor comprising a stator bearing an electrically powered winding; and
    an external rotor comprising:
       a bell housing with an annular wall, and
       at least one permanent magnet fixed to the annular wall by adhesive means sited between the annular wall and a rear face of the permanent magnet,
       wherein the rear face of the permanent magnet has a fixing zone defined by a radius of curvature which is greater than the radius of curvature of the annular wall, said fixing zone thus contributing to forming a cavity for accepting said adhesive means, and
       wherein the ratio between the radius of curvature of the surface delimited by the fixing zone and the radius of curvature of the annular wall is comprised between 1.1 and 4.2.

15. A permanent magnet rotor for an electric motor comprising
    a bell housing with an annular wall; and
    at least one permanent magnet fixed to the annular wall by adhesive means disposed discontinuously along the annular wall of the bell housing, between the annular wall and a rear face of the permanent magnet,
    wherein the rear face of the permanent magnet has a fixing zone defined by a radius of curvature which is greater than the radius of curvature of the annular wall, said fixing zone thus contributing to forming a cavity for accepting said adhesive means, and wherein the adhesive means is sited so as to allow part of the rear face of the permanent magnet to be in direct contact with the bell housing on each side of the fixing zone in which the adhesive retaining means are confined, and wherein the ratio between the radius of curvature of the surface delimited by the fixing zone and the radius of curvature of the annular wall is comprised between 1.1 and 4.2.

* * * * *